United States Patent

Reichel

[15] 3,665,027
[45] May 23, 1972

[54] PROCESS FOR PREPARING GAMMA-AMINOPROPYLALKOXY-SILANES AND GAMMA-AMINOPROPYLA-LKYLALKOXYSILANES

[72] Inventor: Sigrid Reichel, Dresden, Germany

[73] Assignee: Institut fur Silikon- und Fluorkarbon-Chemie, Radebeul, Germany

[22] Filed: July 23, 1969

[21] Appl. No.: 844,189

[52] U.S. Cl............260/448.8 R, 260/448.2 N, 260/448.2 E, 117/135.1
[51] Int. Cl. ........................................C07f 7/04, C07f 7/02
[58] Field of Search................260/448.8 R, 448.2 E, 448.2 N

[56] References Cited

UNITED STATES PATENTS

| | | | |
|---|---|---|---|
| 2,832,754 | 4/1958 | Jex et al. | 260/448.2 X |
| 3,033,815 | 5/1962 | Pike et al. | 260/448.2 X |
| 3,186,965 | 6/1965 | Plueddeman | 260/448.2 X |
| 3,402,191 | 9/1968 | Morehouse | 260/448.2 |

Primary Examiner—Tobias E. Levow
Assistant Examiner—Werten F. W. Bellamy
Attorney—Tab T. Thein

[57] ABSTRACT

A process for preparing gamma-aminopropylalkoxysilanes and gamma-aminopropylalkylalkoxysilanes by an addition of allylamine to hydrogenalkoxysilanes or hydrogenalkylalkoxysilanes, which comprises boiling the components under reflux, in the presence of a catalyst known for addition reactions, until the temperature of the reaction mixture reaches a constant level above 110° C. The time required is from 30 to 40 hours. The peroxysilanes formed simultaneously with the gamma-aminopropylalkoxysilanes and gamma-aminorpopylalkylalkoxysilanes can be removed by vacuum distillation, as first runs. The residue is then a useful adhesion-promoting agent for glass fiber-reinforced synthetics. Other uses for the gamma-aminopropylalkoxysilanes and gamma-aminopropylalkylalkoxysilanes of this invention are: surface treating of textiles, leather, ceramics, glass; corrosion protection of metals, use as primers and adhesives and for modifying synthetics.

8 Claims, No Drawings

PROCESS FOR PREPARING GAMMA-AMINOPROPYLALKOXY-SILANES AND GAMMA-AMINOPROPYLALKYLALKOXYSILANES

The invention relates to the preparation of gamma-aminopropylalkoxysilanes and gamma-aminopropylalkylalkoxysilanes by the addition of allylamine to hydrogenalkoxysilanes or hydrogenalkylalkoxysilanes.

Several processes are known for preparing gamma-aminopropylalkoxysilanes. They are obtained by reduction of beta-cyanoethylalkoxysilanes or by amination of gamma-chloropropylalkoxysilanes with ammonia. In both cases, operations have to be carried out under elevated pressure, for instance in an autoclave. J. S. Saam and J. L. Speier (J. Org. Chem. 24 1959, 119) added triethoxysilane to trimethylallyl-silazane and subsequently split off with alcohol gamma-aminopropyltriethoxysilane; however that process has many stages and is too expensive for technical applications.

Namjetkin et al. (Dokl. Akad. Nauk. UdSSR, 140 /1961/ 384, C.A. 56 /1962/ 493 f) added trioxysilane to allylamine with $H_2PtCl_6$ as catalyst obtaining a yield of 10 percent. If this reaction were carried out at higher temperature, it would again be necessary to work in an autoclave because of the low boiling point of allylamine (b.p. 56.5° C.). Another drawback to be expected when working at higher temperature was condensation by heat, known to occur especially in the case of aminoalkoxysilanes; this would considerably reduce the yield in the desired addition product.

It is an object of the present invention to provide a process for making gamma-aminopropylalkoxysilanes and gamma-aminopropylalkylalkoxysilanes that is simple and can be carried out if possible by a single-step operation.

It is another object of the invention to provide a process which can be carried out in simple apparatus with avoidance of pressure devices.

It is yet another object to provide a process which makes use of readily available starting materials.

Other objects and advantages of the process according to the invention will become apparent from the following detailed description.

It has now been found quite unexpectedly that it is possible to prepare in a single-step operation gamma-aminopropylalkoxysilanes and gamma-aminopropylalkylalkoxysilanes without use of an autoclave and in very satisfactory yields, by adding, in the presence of a catalyst known for addition reactions, allylamine directly to hydrogenalkoxysilanes or hydrogenalkylalkoxysilanes, the yields being 85 percent and over.

In carrying out the process, the reaction mixture of hydrogensilane and allylamine is heated with the use of a reflux cooler so that the temperature in the reaction mixture will rise slowly. Heating has to be continued until a temperature of more than 110° C. is reached. Toward the end of the reaction, the temperature reaches a constant level. This takes from 10 to 40 hours.

It is surprising that neither heat condensation, which would be expected, nor decomposition of the aminoalkoxysilanes occurs when the reaction is conducted in the above manner so that yields of more than 85 percent can be obtained.

As hydrogenalkoxysilanes we may use hydrogentrialkoxysilanes or alkylhydrogenalkoxysilanes, especially methylhydrogendialkoxysilane; the following formula exemplifies the reaction when alkylhydrogenalkoxysilanes are used:

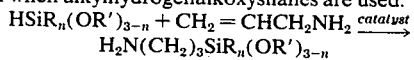

wherein R and R' = lower alkyl, $n = 0$ to 2.

In a modified embodiment of the process of the invention, we may use a mixture of a major amount of hydrogenalkoxysilane with a smaller amount of tetraalkoxysilane; the yields in that case are particularly satisfactory, reaching the upper limits mentioned above, i.e. 85 percent and over.

As catalysts we may use the conventional addition catalysts applied in organosilicon chemistry; preferably, because of its simple manipulation, hexachloroplatinic acid is isopropanol. Catalyst mixtures may also be used, e.g., those described in U.S. Pat. No. 2,971,970.

The addition of hydrogenalkoxysilanes to allylamine proceeds at high yields according to the invention by heating the mixture to above 110° C. over an extended period of time until a constant level of temperature is reached in the reaction vessel.

The reaction time can be considerably reduced by carrying out the reaction in solvents having a higher boiling point than the components to be added to one another. In that case, too, neither heat condensation nor decomposition is occurring, which is contrary to expectation.

If work in the presence of a solvent is intended, the reaction can be conducted in such a manner that peroxysilanes formed at the same time as the hydrogenalkoxysilanes are not separated but that the reaction mixture is used as such for the addition reaction, whereby the peroxides are acting as a valuable, higher boiling solvent. In this way it is possible to dispense with the purification of the hydrogenalkoxysilanes by distillation before the addition reaction, as was necessary up to now.

After the addition has occurred, the peroxysilanes are easily removed in vacuo as first run. The remaining residue can be used immediately as adhesion-promoting agent for glass fiber-reinforced synthetics if the aqueous solutions are freed by filtration from the hydrolysis products precipitated in small quantities.

Gamma-aminopropyltrialkoxysilanes and -methyldialkoxysilanes are used in the surface treatment of textiles, leather, ceramics and glass, for coorrosion protection of metals, as primer and adhesive, as well as for modifying synthetics.

In the following, the invention will be more fully described with reference to a number of examples, but it should be understood that these are given by way of illustration and not of limitation, and that many modifications may be made without departing from the spirit of the invention.

EXAMPLE 1

Fifty-seven g (1 mol) allylamine were heated to 50° C. with 18 g triethoxysilane and 0.8 ml of a 0.1 molar solution of $H_2PtCl_6$ in isopropanol was added. The addition reaction set in, and within 20 minutes we added, drop by drop, 160 g (total amount one mol) 96 percent triethoxysilane. The temperature rose during this to 70° C. Subsequently the mixture was boiled under refluxing for 56 hours until the temperature in the reaction mixture remained constant at 125° C. The mixture was distilled at 8 torr (1 torr = 1 mm Hg). After collecting the first run to 70° C. there remained 201 g (86.5 percent of the theory) crude gamma-aminopropyltriethoxysilane which upon distillation for purification yielded 172 g (79 percent of the theory) of the pure product ($n_D^{20} = 1.4220$; $d_4^{20} = 0.979$; boiling point$_6$ : 80° to 85° C.).

The longer reaction time is explained by the fact that when equivalent amounts of triethoxysilane and allylamine are reacted the reaction takes longer than in the presence of a higher boiling solvent (for example tetraethoxysilane, see Example 6 which will follow; or when non-equivalent amounts of triethoxysilane and allylamine are reacted; or in the presence of a greater amount of a catalyst, such as described in EXAMPLE 7 which will follow).

EXAMPLE 2

In a similar manner as described in EXAMPLE 1, we reacted 228 g (4 mol) allylamine with 959 g of a mixture of 75 percent triethoxysilane (4.4 mol) and 25 percent tetraethoxysilane and 3.2 ml of a 0.1 molar solution of $H_2PtCl_6$. During 32 hours, the reaction temperature rose to 180° C. The residue remaining after removal of first run of 752 g (85 percent of the theory) yielded after distillation pure gamma-aminopropyltriethoxysilane ($n_D^{20} = 1.4218$; $d_4^{20} = 0.978$; b. p.$_6$: 80° to 85° C.).

EXAMPLE 3

The reaction was carried out with 164 g of a mixture consisting of 75 percent (0.75 mol) triethoxysilane and 25 percent tetraethoxysilane with 57 g (1 mol) allylamine and a catalyst mixture consisting of 4 g tetramethylethylenediamine, 5.2 g triethylamine and 5.2 g CuCl; the temperature of the vessel reached 150° C. after 38 hours. After having distilled the first run, there remained 87 g (55 percent of the theory) gamma-aminopropyltriethoxysilane.

EXAMPLE 4

When 86 g (0.7 mol) trimethoxysilane were reacted with 40 g (0.7 mol) allylamine in the presence of 0.7 ml of 0.1 molar hexachloroplatinic acid, 116° C. were reached after boiling for 36 hours under reflux. A first run was collected at 2 torr up to 60° C., whereafter 75 g (60 percent of the theory) of gamma-aminopropyltriemethoxysilane remained.

Parameters after vacuum distillation: b.p.$_2$: 85° C.; $n_D^{20}$ = 1.4251; $d_4^{20}$ = 1.057.

EXAMPLE 5

One hundred and forty-seven g methyldiethoxysilane (1.1 mol) were heated with 57 g (1 mol) allylamine and 0.8 ml of 0.1 molar $H_2PtCl_6$; after 40 hours boiling time, 146° C. were reached in the reaction mixture. A first run was collected at 5 torr up to 65° C., which left 102 g (54 percent of the theory) gamma-aminopropylmethyldiethoxysilane. After having been distilled in vacuo once more, the product showed the following parameters: b.p.$_5$: 70° to 80° C.; $n_D^{20}$ = 1.4304; $d_4^{20}$ = 0.964.

EXAMPLE 6

Two thousand g (8.6 mol) triethoxysilane containing 31 percent tetraethoxysilane were heated to 65° C. with 492 g (8.6 mol) allylamine and 12.4 ml of a 0.1 molar solution of $H_2PtCl_6$ in isopropanol were added. After refluxing for 19 hours, the temperature in the reaction mixture was 160° C. Upon distillation in vacuo at 1.5 torr between 70° and 100° C. we obtained 1674 g (88 percent of the theory) of gamma-aminopropyltriethoxysilane of $n_D^{20}$ = 1.4224.

EXAMPLE 7

Three hundred and thirty-two g (2 mol) 95 percent triethoxysilane containing 5 percent tetraethoxysilane were heated to 70° C. with 112 ml allylamine, and 6 ml 0.1 molar solution of $H_2PtCl_6$ in isopropanol were injected thereinto. The temperature in the reaction mixture rose to 190° C. within 14 hours. After having collected the first run up to a temperature of 70° C. at 1 torr there remained 270 g technical grade gamma-aminopropyltriethoxysilane (82 percent of the theory) of $n_D^{20}$ = 1.4261 and $d_4^{20}$ = 0.972, which resulted upon distillation at 1 torr and 70° to 100° C. in 235 g (71 percent of the theory) of pure gamma-aminopropyltriethoxysilane of $n_D^{20}$ = 1.4202 and $d_4^{20}$ = 0.959.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What I claim is:

1. A process for preparing gamma-aminopropylalkoxysilanes and gamma-aminopropylalkylalkoxysilanes by an addition of allylamine to hydrogenalkoxysilanes or hydrogenalkylalkoxysilanes, which comprises mixing the reaction components at a starting temperature of about 60° C. and gradually raising the temperature by boiling the components under reflux, in the presence of a catalyst known for addition reactions, until the temperature of the reaction mixture reaches a constant level above 110° C.

2. The process as defined in claim 1, wherein the reaction is carried out in the absence of a higher boiling solvent for about 50 to 60 hours.

3. The process as defined in claim 1, wherein the reaction is carried out in a solvent having a higher boiling point than the reaction for 10 to 40 hours.

4. The process as defined in claim 3 wherein the peralkoxysilanes obtained simultaneously in the preparation of hydrogenalkoxysilanes remain as solvent in the reaction mixture but are removed as first run by vacuum distillation after the addition reaction is completed.

5. The process as defined in claim 3, wherein allylamine and a mixture of triethoxysilane and tetraethoxysilane are reacted in substantially equimolar proportion until the temperature has reached a constant level, whereby gamma-aminopropyltriethoxysilane is produced.

6. The process as defined in claim 3, wherein allylamine and trimethoxysilane are reacted in substantially equimolar proportion until the temperature has reached the constant level of 116° C., whereby gamma-aminopropyltrimethoxysilane is produced.

7. The process as defined in claim 3, wherein allylamine and methyldiethoxysilane are reacted in substantially equimolar proportion until the temperature has reached the constant level of 146° C., whereby gamma-aminopropylmethyldiethoxysilane is produced.

8. The process as defined in claim 3, wherein the solvent is tetraalkoxysilane.

* * * * *

UNITED STATES PATENT OFFICE
CERTIFICATE OF CORRECTION

Patent No. 3,665,027                    Dated May 23, 1972

Inventor(s) Sigrid Reichel

It is certified that error appears in the above-identified patent and that said Letters Patent are hereby corrected as shown below:

1. change the third and fourth lines of the Title /54/ as follows: -- GAMMA-AMINOPROPYL-ALKYLALKOXYSILANES --;

2. in the Abstract, lines 9 and 10 thereof /57/ (column on the right-hand side of the title page), change "gamma-aminor-popylalkylalkoxysilanes" to -- gamma-aminopropylalkylalkoxysilanes --;

3. in Claim 3, line 3 (column 4, line 28), change "reaction" to -- reactants --.

Signed and sealed this 5th day of December 1972.

(SEAL)
Attest:

EDWARD M. FLETCHER, JR.              ROBERT GOTTSCHALK
Attesting Officer                     Commissioner of Patents